United States Patent
Patterson et al.

(10) Patent No.: US 9,462,751 B2
(45) Date of Patent: Oct. 11, 2016

(54) METHOD OF REMOTELY CONFIGURING A RESIDUE SYSTEM OF AN AGRICULTURAL HARVESTER

(71) Applicant: CNH Industrial America, LLC, New Holland, PA (US)

(72) Inventors: Chase Patterson, Camp Hill, PA (US); Mark D. Dilts, New Holland, PA (US); Nathan E. Isaac, Lancaster, PA (US); Michael A. Conrad, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/681,511

(22) Filed: Apr. 8, 2015

(65) Prior Publication Data

US 2015/0208579 A1     Jul. 30, 2015

Related U.S. Application Data

(63) Continuation of application No. 13/874,833, filed on May 1, 2013, now Pat. No. 9,107,345.

(51) Int. Cl.
| | |
|---|---|
| *A01D 69/00* | (2006.01) |
| *A01D 69/06* | (2006.01) |
| *A01F 12/58* | (2006.01) |
| *A01D 41/127* | (2006.01) |
| *A01D 69/08* | (2006.01) |
| *F16H 7/02* | (2006.01) |
| *F16H 9/04* | (2006.01) |
| *F16H 61/12* | (2010.01) |
| *A01D 41/12* | (2006.01) |

(52) U.S. Cl.
CPC ............ *A01D 69/06* (2013.01); *A01D 41/1243* (2013.01); *A01D 41/1274* (2013.01); *A01D 69/08* (2013.01); *A01F 12/58* (2013.01); *F16H 7/02* (2013.01); *F16H 9/04* (2013.01); *F16H 61/12* (2013.01)

(58) Field of Classification Search
CPC .. A01D 69/08; A01D 69/06; A01D 41/1274; A01D 41/142; A01D 41/1243; A01F 12/40; A01F 12/58; F16H 9/04; F16H 17/02; F16H 9/16; F16H 61/12; F16H 2007/0806; F16D 11/10; F16D 28/00; F16D 48/068
USPC .......... 56/10.2 A–10.2 E, 10.2 R, 11.1, 11.2, 56/11.9; 474/58; 460/16, 114; 701/50
See application file for complete search history.

(56) References Cited

U.S. PATENT DOCUMENTS

| | | |
|---|---|---|
| RE26,512 E | 12/1968 | Rohweder |
| 4,089,396 A | 5/1978 | Quick |
| 4,173,155 A | 11/1979 | Togami et al. |
| 6,722,112 B2 | 4/2004 | Pierce et al. |

(Continued)

FOREIGN PATENT DOCUMENTS

| | | |
|---|---|---|
| DE | 3528683 A1 | 2/1987 |
| EP | 0547632 A1 | 6/1993 |

*Primary Examiner* — Robert Pezzuto
(74) *Attorney, Agent, or Firm* — Patrick M. Sheldrake (57) ABSTRACT

An agricultural harvester residue handling selection method having the steps of: selecting a chop/swath residue handling mode resulting in a mode selection; setting a chopper speed range for a chopper in a residue handling section dependent upon the mode selection; and positioning a windrow door dependent upon the mode selection.

20 Claims, 7 Drawing Sheets

(56) References Cited

U.S. PATENT DOCUMENTS

| | | |
|---|---|---|
| 6,773,367 B2 | 8/2004 | Laufenberg et al. |
| 6,839,616 B2 | 1/2005 | Beck |
| 7,568,330 B2 | 8/2009 | Vogelgesang |
| 7,867,072 B2 | 1/2011 | Lauwers et al. |
| 2008/0305841 A1* | 12/2008 | Overschelde ...... A01D 41/1243 460/59 |
| 2013/0210506 A1 | 8/2013 | Hollatz |
| 2015/0351322 A1* | 12/2015 | Desmet .............. A01D 41/1243 460/114 |

\* cited by examiner

METHOD OF REMOTELY CONFIGURING A RESIDUE SYSTEM OF AN AGRICULTURAL HARVESTER

CROSS REFERENCE TO RELATED APPLICATIONS

This is a continuation of U.S. patent application Ser. No. 13/874,833, entitled "METHOD OF REMOTELY CONFIGURING A RESIDUE SYSTEM OF AN AGRICULTURAL HARVESTER", filed May 1, 2013, which is incorporated herein by reference.

BACKGROUND OF THE INVENTION

1. Field of the Invention

The present invention relates to agricultural harvesters such as combines, and, more particularly, to residue systems used in such combines.

2. Description of the Related Art

An agricultural harvester known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The residue system is configurable between a chopping and spreading mode and a windrowing mode, by stopping the combine and going to the rear of the combine and configuring the residue system to distribute the non-grain material in a chopping and spreading mode or in a windrowing and spreading chaff mode. Each time it is desired to change the mode the operator has to repeat this process.

What is needed in the art is a residue handling system for an agricultural combine which can be reliably changeable between residue handling modes from the cab of the combine.

SUMMARY OF THE INVENTION

The present invention provides a method of selecting modes for a residue handling system of an agricultural harvester.

The invention in one form is directed to an agricultural harvester residue handling selection method having the steps of: selecting a chop/swath residue handling mode resulting in a mode selection; setting a chopper speed range for a chopper in a residue handling section dependent upon the mode selection; and positioning a windrow door dependent upon the mode selection.

The invention in another form is directed to An agricultural harvester including a chassis, a residue handling system carried by the chassis; and a controller configured to carry out a residue handling system selection method including the steps of: residue handling selection method having the steps of: selecting a chop/swath residue handling mode resulting in a mode selection; setting a chopper speed range for a chopper in a residue handling section dependent upon the mode selection; and positioning a windrow door dependent upon the mode selection.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
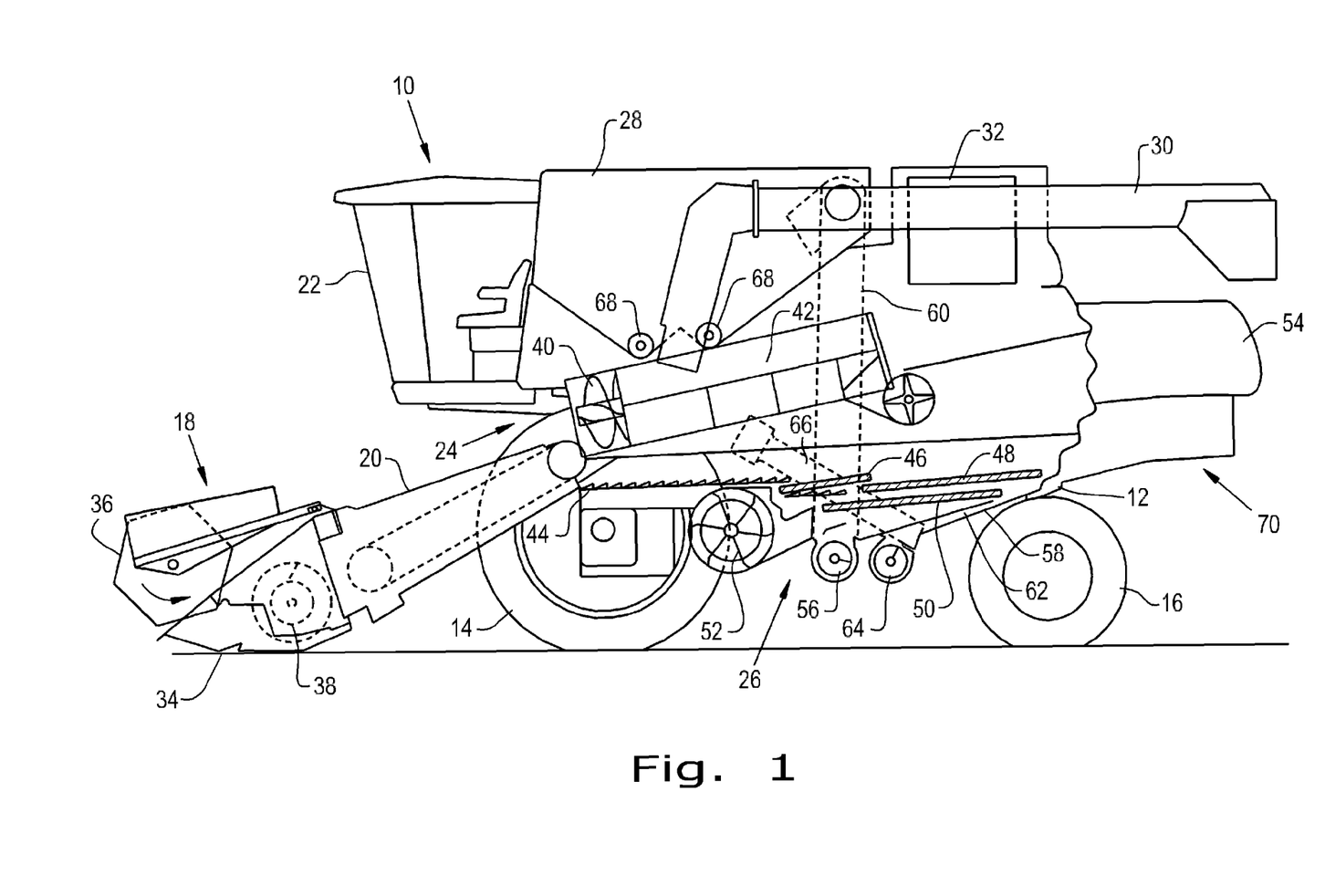
FIG. 1 is a side view of an embodiment of an agricultural harvester in the form of a combine which includes an embodiment of a residue system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a windrow door and a residue spreader. When combine 10 is in the chopping and spreading mode, the chopper is set to a high speed (3,000 RPM), the counter knives may be engaged, the windrow door is closed and the residue spreader is running. This causes the non-grain crop material to be chopped in to pieces of approximately 6 inches or less and spread on the ground. When combine 10 is in the windrow mode the chopper is at a low speed (800 RPM), the counter knives are disengaged and the windrow door is open. The residue spreader may continue operation to spread only the chaff, with the crop material passing through the passageway created by the open windrow door.

Figure 2:
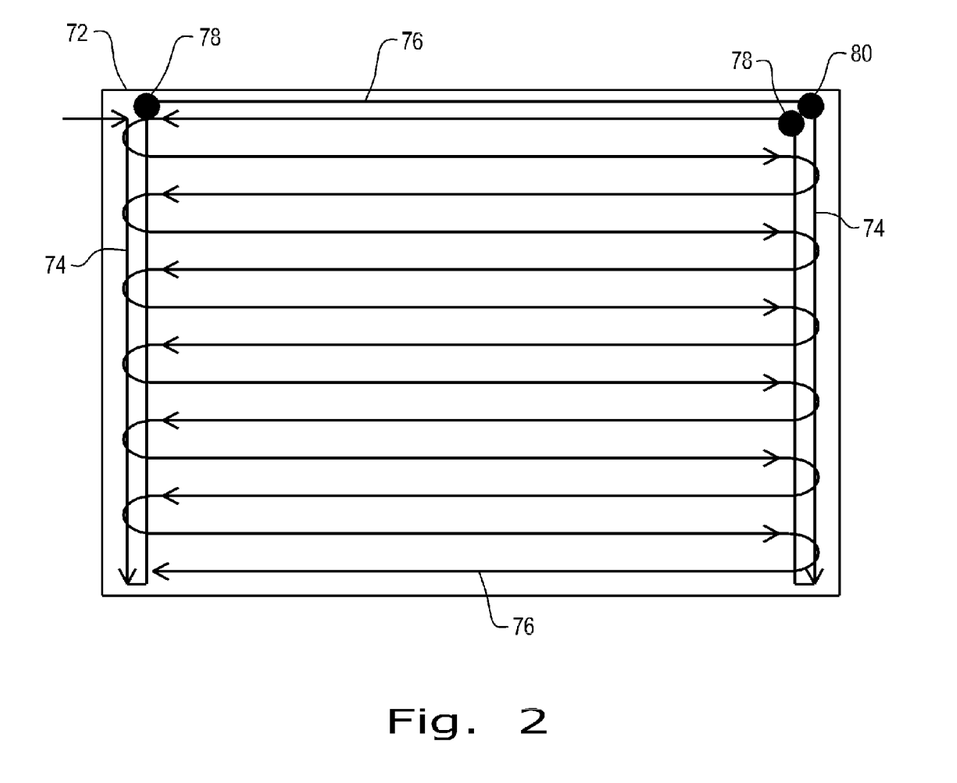
FIG. 2 is a schematical representation of a field to illustrate when shifting residue modes may be undertaken with the residue system contained in the combine of FIG. 1.

Now, additionally referring to FIG. 2 there is shown a field 72, combine 10 enters field 72 at the upper left and is in an assumed chopping and spreading mode. Combine 10 starts harvesting by turning right and proceeding along a pathway in the chopping and spreading mode 74 to create a headland that is generally two header widths wide. The headland is a harvested section that permits combine 10 to turn around when harvesting the rest of the field without driving on unharvested crop. To chop and spread the crop residue in the headlands at each end of field 72 allows combine 10 to not have to cross windrows that can potentially drag beneath combine 10. The additional residue left in the headlands helps to prevent field erosion. It is also possible to have an entire border around field 72 where the crop residue is spread. At chop-to-windrow change point 78 residue handling system 70 is changed to a windrow mode and combine 10 proceeds along a pathway in a windrow mode 76 until getting to windrow-to-chop change point 80. At change point 80 residue handling system 70 is changed to a chopping and spreading mode and travels along another pathway in chopping and spreading mode 74 until reaching change point 78. At change point 78 residue handling system 70 is again changed to windrow mode 76 and the rest of field 72 is completed. The mode may be changed at the conclusion of the field in anticipation of the next field.

Figure 3:
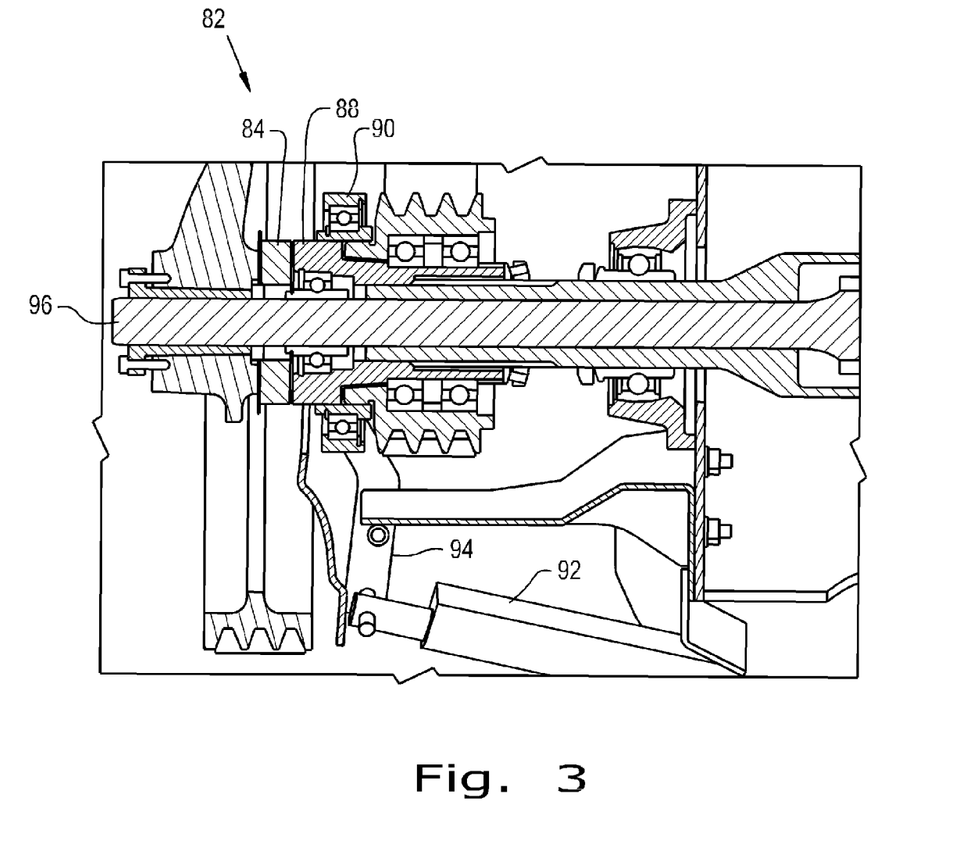
FIG. 3 is a partially sectioned view of an inline shaft shifting system used by an embodiment of a shifting method of the present invention used in the combine of FIG. 1.
Figure 4:
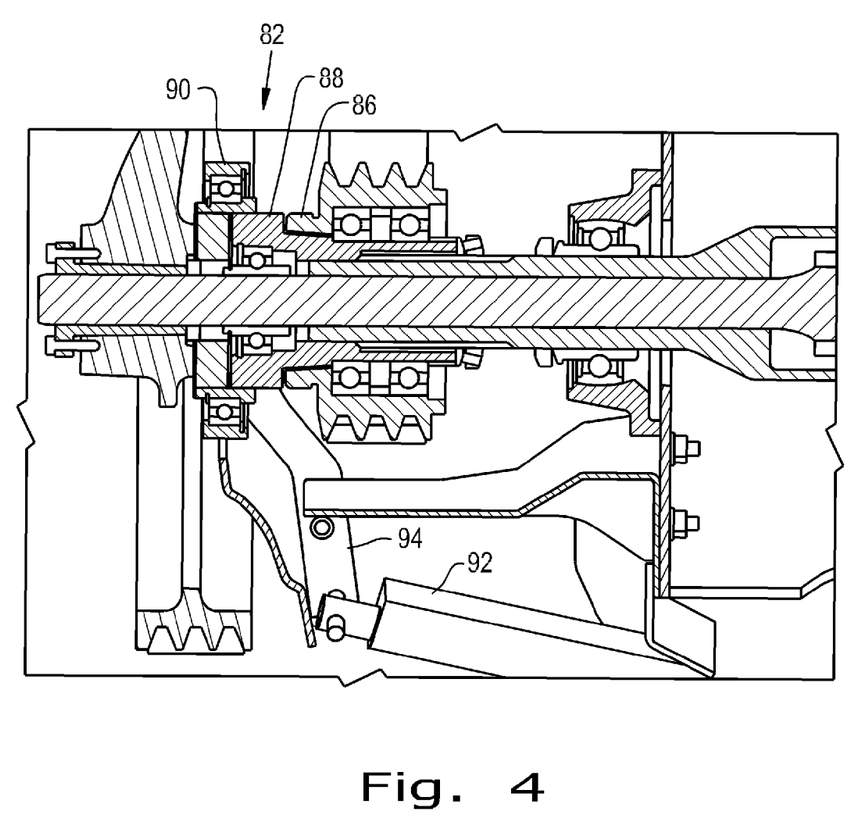
FIG. 4 is another partially sectioned view of the inline shaft shifting system of FIG. 3 with a shifting collar moved to a position different than that illustrated in FIG. 3.

A problem, that is solved by the present invention, can be encountered when shifting the chopper between high and low speeds. Now, additionally referring to FIGS. 3 and 4, there can be seen a clutch system 82 having pulley splines 84, pulley splines 86, hub spines 88, a collar 90, an actuator 92 and a collar fork 94. Collar 88 is shown in FIG. 3 engaging drive hub splines 88 with pulley splines 86 placing inline shaft 96 into a high speed mode for driving the chopper. As seen in FIG. 4 actuator 92 has moved collar fork 94 causing collar 90 to be shifted to thereby couple pulley splines 84 with hub splines 88 to place clutch system 82 into a low speed mode. The problem alluded to above occurs when the internal splines of collar 90 hit the end of either pulley splines 84 or pulley splines 86 (depending on the direction of the shift) and do not properly engage, which can be referred to as a mid-stroke stall.

Figure 5:
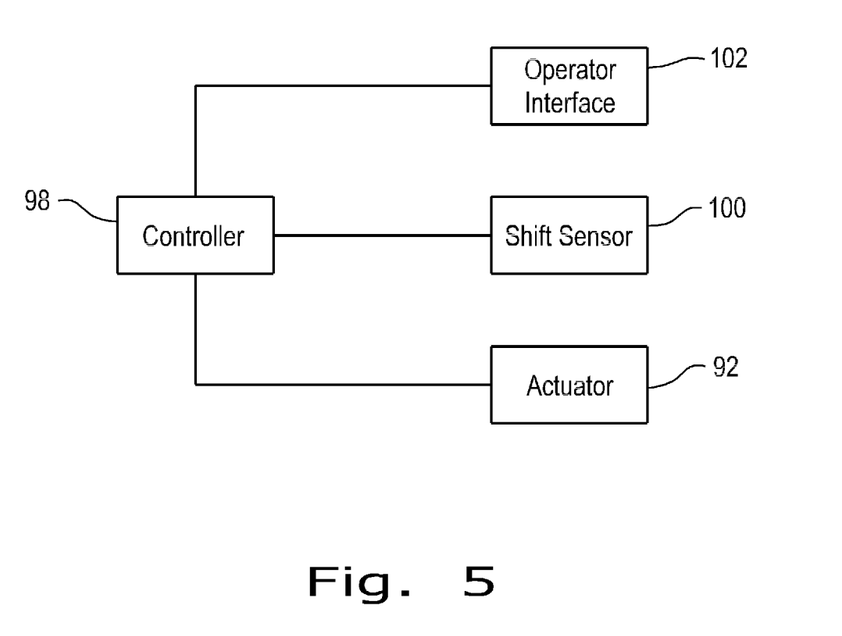
FIG. 5 is a schematical representation of an embodiment of a residue control system used with the shifting system of FIGS. 3 and 4 in the combine of FIG. 1.
Figure 6:
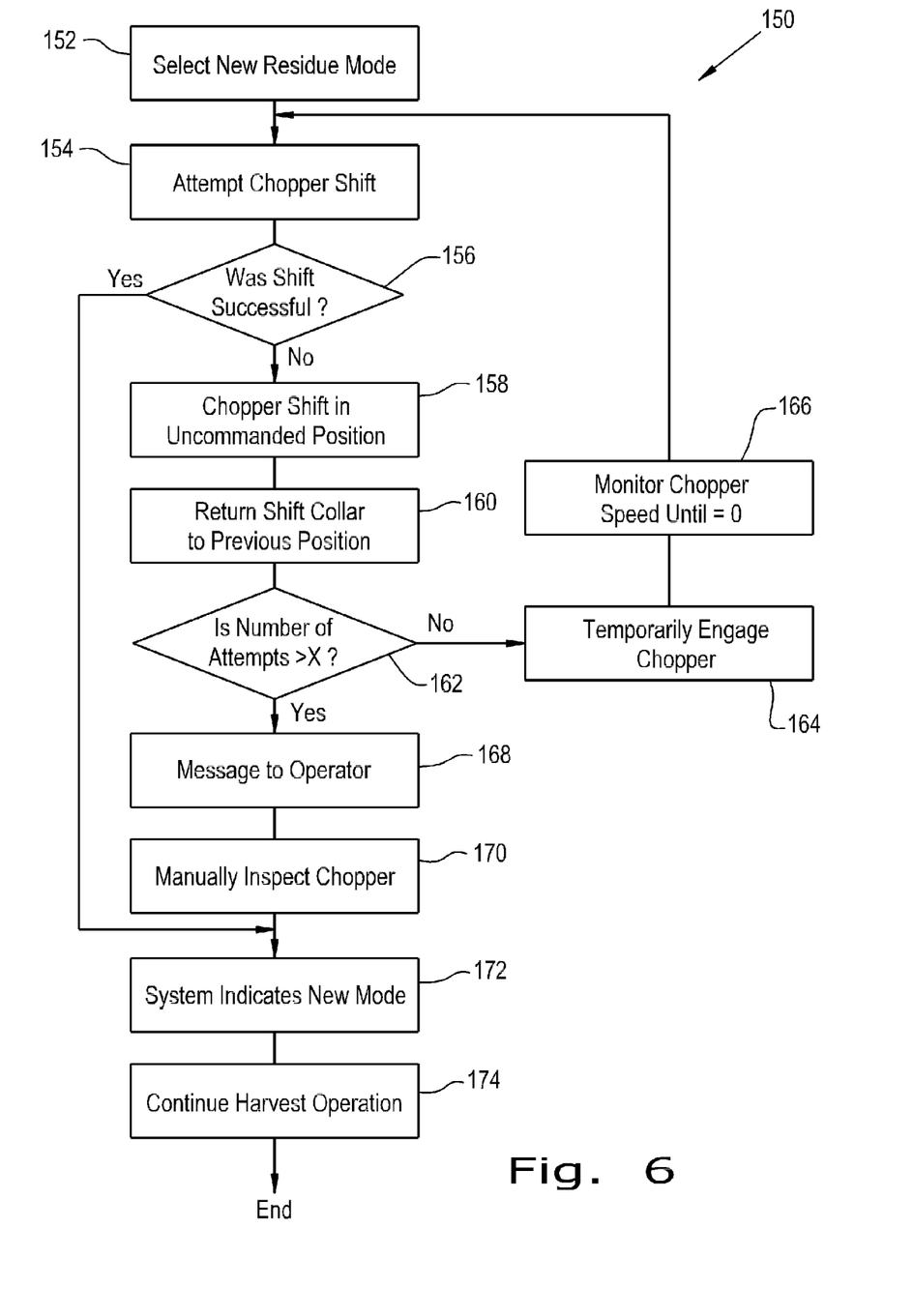
FIG. 6 illustrates an embodiment of a shifting method of the present invention used with the shifting system of FIGS. 3 and 4 in the combine of FIG. 1.

Now, additionally referring to FIGS. 5 and 6, there is shown a controller 98 coupled to actuator 92, a shift sensor 100 and an operator interface 102. Controller 98 carries out the steps of method 150. Operator interface 102 is located in cab 22 and can be either a standalone system or integrated into an existing interface. Shift sensor 100 is a position sensor associated with clutch system 82 to detect the position of collar 90 directly or indirectly. Sensor 100 may be integrated with actuator 92. Controller 98 may be a standalone controller or integrated with a system controller of combine 10. An operator selects a new residue mode at step 152 on operator interface 102 and controller 98 receives the command. Controller 98 causes actuator 92 to attempt to shift collar 90 at step 154. If sensor 100 detects a successful shift then method 150 proceeds to step 172 and controller 98 sends a message to operator interface 102 causing a display to indicate the new mode of residue handling system 70.

When the problem discussed herein is encountered sensor 100 detects that the attempted shift was not successful at step 156 and it is determined at step 158 that collar 90 is in an uncommanded position. Collar 90 is then returned to the previous position at step 160 and if the number of attempts to engage collar 90 is less than X as determined in step 162, where X is anticipated to be 3, although other numbers are contemplated, then method 150 proceeds to step 164. At step 164 the chopper drive is temporarily engaged for a short period of time, perhaps less than 2 seconds, just enough to change the spline misalignment that led to the mid-stroke stall. The chopper speed is monitored at step 166 until the chopper speed is approximately equal to zero, or until it is absolutely zero and then the chopper shift is attempted again at step 154.

If at step 162, it is determined that the number of sequential attempts to shift collar 90 is greater than X, then the operator is alerted by way of a message sent at step 168 to operator interface 102. The message alerts the operator that the shift was not successful and a manual inspection of clutch system 82 is required as illustrated at step 170.

Additionally, prior to the engagement of the chopper at step 164, the operator may be requested to initiate the engagement to thereby preserve vehicle safety interlocks. It is also contemplated that a sensor system may be in place to detect if anyone is proximate to combine 10 so that an automated engagement can occur without the operator commanding it.

The following table denotes mode selections and the resulting selection for the chopper speed, the counter knife position, the position of the windrow door and the spreader position.

Chop/Swath Residue Handling Modes

| Mode | Chopper Speed | Counter Knife Position | Windrow Door Position | Spreader Position |
| --- | --- | --- | --- | --- |
| Spread chaff and unchopped straw | Low | 0% | Closed | Down |
| Windrow unchopped straw and chaff | Low | 0% | Closed | Up |
| Windrow unchopped straw and spread chaff | Low | 0% | Open | Down |
| Spread chaff and chopped straw | High | 0-100% | Closed | Down |
| Windrow chopped straw with chaff | High | 0-100% | Closed | Up |
| Windrow chopped straw and spread chaff | High | 0-100% | Open | Down |

Figure 7:
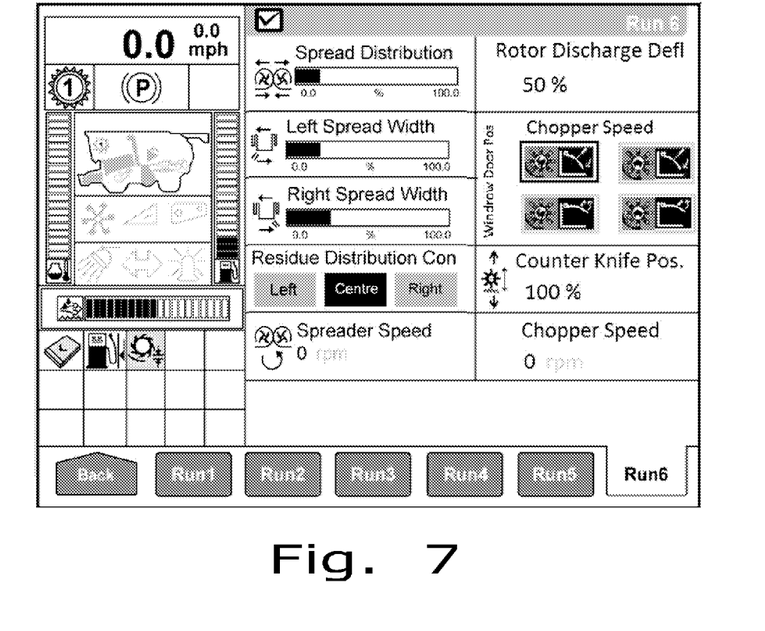
FIG. 7 is an illustration of a display on the operator interface used with the residue system of the present invention.
Figure 8:
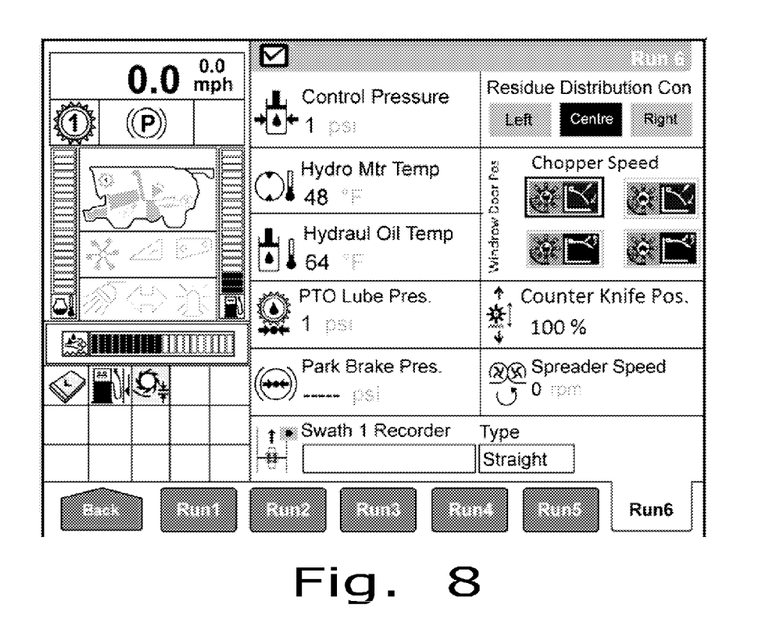
FIG. 8 is an illustration of another display on the operator interface used with the residue system of the present invention.

Now, additionally referring to FIGS. 7 and 8 there are shown some possible interface screens for the operator interface. A 4-button matrix is illustrated to allow the operator to select the desired mode. The buttons are created with dual icons representing the primary components being controlled. As shown the chopper speed is shown in columns, high and low, and represented by a rabbit and a turtle inside a chopper icon. The windrow door icon shows the door in an open or closed state according to the row.

The buttons and underlying control program is configurable to control secondary sub-systems, such as the chopper counter knife position. The system includes control of the chopper counter knife position, in that the counter knives may or may not be engaged (>0%) when the chopper is in high speed, depending on the level of chopping that is desired and the ease with which the crop is chopped. In a dry crop condition, it may not be necessary to engage the counter knives, whereas if the crop is damp and the chopping more difficult, then the counter knives may be engaged. However, to protect the drive system of the combine, certain chopper systems cannot chop with the counter knives engaged if the chopper is at slow speed. This will cause high torque on the chopper drive system, potentially causing damage. Thus, residue handling system 70 will automatically disengage (0%) the counter knives whenever the chopper is selected for slow speed operation.

As an example, if residue handling system 70 is in the chopping and spreading mode with the counter knives engaged (>0%), and the operator wants to switch to the windrowing mode, first the machine is disengaged, and then the new mode is selected. Then the system will provide the necessary signals to the required actuators to open the windrow door and shift the chopper to low speed and the counter knives are automatically disengaged to 0% because they are not desired in the windrowing mode. The system can remember the last engaged position of the counter knives, such that a subsequent return to the chopping and spreading mode will also reengage the counter knives to the previous position.

It is further considered that additional sub-systems of residue handling system 70 could be connected to the desired modes, such as spreader impeller speed, deflector positions, and spreader position (operating/storage); the windrow chute position and side deflector angles when in the windrowing mode.

The threshing system of combine 10 influences the straw quality, so it is also contemplated that controller 98 may control components in other combine systems, especially the threshing system features such as concave clearance, cage vane angle, or rotor speed. It is further contemplated that the chopper counter knives may not be returned to a previous setpoint.

Advantages of the present invention include utilizing existing clutches and components already on combine 10 and does not require complex and specially designed components. Further, the interface allows the operator to select the desired operating mode without multiple buttons and switches.

Relative to residue handling system 70, it is contemplated that controller 98 could automatically engage residue handling system 70 if other sensors were used that would guarantee no bystanders were near the machine, as briefly mentioned above. Sensors, like backup sensors on automotive vehicles, could be used. It is also contemplated that if combine 10 has a chopper which permits chopping crop residue in slow speed, then the integral chopper system can convert on-the-go from the chopping and spreading mode to the windrowing mode by disengaging the counter knives and opening the windrow door, and vice-versa. This type of chopper may be a roto-processor, such as previously patented by Case New Holland in U.S. Pat. No. 7,867,072, and commonly used on balers. It is additionally contemplated that the system will remember the last engaged position of the counter knives, such that a return to the chopping and spreading mode will also engage the counter knives.

It is further conceived that alternatively it may be unnecessary to engage the chopper drive at step 164 to rotate the chopper. Other methods may be used. For example, an electric motor could be coupled to the input shaft of the chopper to rotate it so that the clutch splines are aligned and the shift collar may slide freely.

Additionally, relative to operator interface 102, a 4-square box matrix could also be used instead of the indicated buttons as proposed. The interface may be on the right-hand console in the operators cab instead of on the touch screen display. Yet further, it is contemplated that the interface may be based on voice recognition (audible input from the operator) of the commanded position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester residue handling selection method, comprising the steps of:
   selecting a chop or swath residue handling mode resulting in a mode selection;
   setting a chopper speed range for a chopper in a residue handling section dependent upon said mode selection; and
   positioning a windrow door dependent upon said mode selection.

2. The agricultural harvester residue handling selection method of claim 1, further comprising the step of positioning a spreader dependent upon said mode selection.

3. The agricultural harvester residue handling selection method of claim 1, further comprising the step of controlling a counter knife insertion level dependent upon said mode selection.

4. The agricultural harvester residue handling selection method of claim 3, further comprising the step of disengaging counter knives by moving the counter knives to a zero percentage insertion level if said mode selection results in a low speed selection for said chopper.

5. The agricultural harvester residue handling selection method of claim 1, wherein if in said selecting step said mode selection is to spread chaff and unchopped straw then said setting step sets said chopper speed range to low and said positioning step positions said windrow door to a closed position.

6. The agricultural harvester residue handling selection method of claim 5, further comprising the step of positioning a spreader in an operating position.

7. The agricultural harvester residue handling selection method of claim 1, wherein if in said selecting step said mode selection is to windrow chaff and unchopped straw then said setting step sets said chopper speed range to low and said positioning step positions said windrow door to a closed position.

8. The agricultural harvester residue handling selection method of claim 7, further comprising the step of positioning a spreader in a non-operating position.

9. The agricultural harvester residue handling selection method of claim 1, wherein if in said selecting step said mode selection is to windrow unchopped straw and spread chaff then said setting step sets said chopper speed range to low and said positioning step positions said windrow door to an open position.

10. The agricultural harvester residue handling selection method of claim 9, further comprising the step of positioning a spreader in an operating position.

11. The agricultural harvester residue handling selection method of claim 1, wherein if in said selecting step said mode selection is to spread chaff and chopped straw then said setting step sets said chopper speed range to high and said positioning step positions said windrow door to a closed position.

12. The agricultural harvester residue handling selection method of claim 11, further comprising the step of positioning a spreader in an operating position.

13. The agricultural harvester residue handling selection method of claim 1, wherein if in said selecting step said mode selection is to windrow chaff and chopped straw then said setting step sets said chopper speed range to high and said positioning step positions said windrow door to a closed position.

14. The agricultural harvester residue handling selection method of claim 13, further comprising the step of positioning a spreader in a non-operating position.

15. The agricultural harvester residue handling selection method of claim 1, wherein if in said selecting step said mode selection is to windrow chopped straw and spread chaff then said setting step sets said chopper speed range to high and said positioning step positions said windrow door to an open position.

16. The agricultural harvester residue handling selection method of claim 15, further comprising the step of positioning a spreader in an operating position.

17. An agricultural harvester, comprising:
- a chassis;
- a residue handling system carried by said chassis; and
- a controller configured to carry out a residue handling system selection method including the steps of:
  - selecting a chop or swath residue handling mode resulting in a mode selection;
  - setting a chopper speed range for a chopper in a residue handling section dependent upon said mode selection; and
  - positioning a windrow door dependent upon said mode selection.

18. The agricultural harvester of claim 17, wherein said residue handling system selection method further includes the step of positioning a spreader dependent upon said mode selection.

19. The agricultural harvester of claim 17, wherein said residue handling system selection method further includes the step of controlling a counter knife insertion level dependent upon said mode selection.

20. The agricultural harvester of claim 19, wherein said residue handling system selection method further includes the step of disengaging counter knives by moving the counter knives to a zero percentage insertion level if said mode selection results in a low speed selection for said chopper.

* * * * *